United States Patent
Spielman (10) Patent No.: US 11,866,326 B2
(45) Date of Patent: Jan. 9, 2024

(54) APPARATUS FOR HIGHLY EFFICIENT COLD-PLASMA OZONE PRODUCTION

(71) Applicant: Rick B. Spielman, Tijeras, NM (US)

(72) Inventor: Rick B. Spielman, Tijeras, NM (US)

( * ) Notice: Subject to any disclaimer, the term of this patent is extended or adjusted under 35 U.S.C. 154(b) by 393 days.

(21) Appl. No.: 17/168,394

(22) Filed: Feb. 5, 2021

(65) Prior Publication Data
US 2022/0250907 A1    Aug. 11, 2022

(51) Int. Cl.
C01B 13/11    (2006.01)

(52) U.S. Cl.
CPC ........ *C01B 13/115* (2013.01); *C01B 2201/12* (2013.01); *C01B 2201/14* (2013.01); *C01B 2201/22* (2013.01); *C01B 2201/32* (2013.01); *C01B 2201/34* (2013.01); *C01B 2201/64* (2013.01); *C01B 2201/72* (2013.01); *C01B 2201/74* (2013.01)

(58) Field of Classification Search
CPC ............... C01B 13/115; C01B 2201/12; C01B 2201/14; C01B 2201/22; C01B 2201/32; C01B 2201/34; C01B 2201/64; C01B 2201/72; C01B 2201/74; C01B 13/11; C01B 13/10; C01B 2201/80; C01B 2201/82; C01B 2201/70; C01B 2201/60; C01B 2201/90; C01B 2201/40; C01B 2201/24; B01J 19/08; B01J 19/088; B01J 35/004
See application file for complete search history.

(56) References Cited

U.S. PATENT DOCUMENTS

| | | | |
|---|---|---|---|
| 607,007 A | 7/1898 | Andreaoli | |
| 882,509 A | 10/1908 | Wood | |
| 1,845,670 A | 5/1929 | Lebrun | |
| 2,010,081 A | 3/1931 | Hartman | |
| 3,081,215 A | 7/1959 | Held | |
| 3,891,561 A | 6/1975 | Lowther | |
| 4,035,657 A * | 7/1977 | Carlson | C01B 13/11 422/186.18 |
| 4,079,260 A | 3/1978 | Dmitriev | |
| 4,213,838 A | 7/1980 | Lowther | |
| 4,417,966 A | 11/1983 | Krauss | |
| 4,461,744 A | 7/1984 | Erni | |
| 4,614,573 A | 9/1986 | Masuda | |

(Continued)

*Primary Examiner* — Xiuyu Tai
(74) *Attorney, Agent, or Firm* — Cermak Nakajima & McGowan LLP; James Creighton Wray (57) ABSTRACT

An apparatus comprising a cold-plasma ozone generator, the ozone generator comprising: a non-arcing non-coronal ozone production cell capable of generating ozone; the ozone production cell having a pair of electrodes placed on two sides of the production cell and spaced apart by an electrode gap, and a dielectric layer on each of the electrodes facing inward into the ozone production cell; a high-voltage pulse generator attached to the electrodes and configured for producing a glow discharge cold plasma between the electrodes, the high-voltage pulse generator being able to produce sufficient voltage to generate the glow discharge cold plasma; a cooling system attached to each of the electrodes; and an oxygen source adapted to provide gas flow through the production cell in the gap between the pair of electrodes that efficiently generates ozone in the cold plasma, wherein the dielectric layers are intimately and directly bonded to each of the electrodes.

18 Claims, 5 Drawing Sheets

(56) References Cited

U.S. PATENT DOCUMENTS 4,619,763 A 10/1986 O'Brien
5,549,874 A 8/1996 Kamiya
9,067,788 B1 6/2015 Spielman

* cited by examiner

APPARATUS FOR HIGHLY EFFICIENT COLD-PLASMA OZONE PRODUCTION

The present invention relates generally to the field of ozone production in air or in oxygen using electrical techniques.

More precisely, the present invention relates to an apparatus that generates cold-plasma using electric-field ionization for ozone production.

BACKGROUND OF THE INVENTION

There is a long history of ozone production, including numerous patents and an extensive literature base. Discussion of publications herein is given for more complete background of the scientific principles and is not to be construed as an admission that such publications are prior art for patentability determination purposes.

Existing electrical ozone production techniques in air and oxygen focus on coronal discharge (CD), dielectric barrier discharge (DBD), electrolytic, or UV methods. More than two hundred and fifty patents for specific apparatuses have been granted over past several decades. Most of the larger ozone generators that are currently marketed use either CD or DBD techniques, whereas smaller generators often use inefficient UV ozone production. Electrolytic techniques are common in water environments.

There is an immediate need to improve the electrical efficiency of ozone production and increase the total output per ozone generator. Industrial applications including potable water purification, industrial water treatment, chemical processing, and agricultural treatment require continuous, large volumes of ozone. The absolute efficiency of ozone production becomes a major cost factor for these high-volume applications. In addition, the use of dry air rather than oxygen would be a major cost savings for many applications in which the absolute maximum concentration of ozone is not critical due to the energy, hardware, and maintenance costs of oxygen concentrators.

A seminal coronal discharge (CD) patent was U.S. Pat. No. 607,007, in which planar plates or screens were separated by a single glass sheet. In that case a DC voltage was applied between the two electrodes and a coronal discharge was set up with the glass as the barrier preventing a run-away discharge. That patent was followed by a host of CD patents over the years. One of the key patents was U.S. Pat. No. 882,509, in which CD from metallic brush tip was described. U.S. Pat. No. 1,845,670 was the first patent in which AC voltages were clearly described and a cylindrical geometry with a single insulator and spiral inner electrode was used. U.S. Pat. No. 3,081,215 was the first patent to describe CD ozone generators with a stack of planar generators and was the first to mention the importance of no air gaps between the electrode and the insulator because of thermal losses. U.S. Pat. No. 3,891,561 described interleaved plate generators with thin, hard, bubble-free dielectric coatings and was the first to note that higher dielectric-constant insulators had improved efficiency. U.S. Pat. No. 4,213,838 described the importance of the gas flow in the generator for cooling the generator dielectric and electrodes. U.S. Pat. No. 4,417,966 recognized the importance of a low capacitance insulator to reduce dielectric losses, and was the first to describe the improvement in performance using an AC driver based on square pulses. U.S. Pat. No. 4,614,573 described the use of a higher-efficiency alumina insulator in cylindrical geometry. U.S. Pat. No. 4,619,763 described the use of active cooling for the output ozone gas. U.S. Pat. No. 5,549,874 was the first patent to explicitly describe the use of sapphire insulators, but only to improve the cleanliness of the system.

A seminal dielectric barrier discharge (DBD) patent was U.S. Pat. No. 2,010,081. While the aforementioned patent used only a single insulator around the inner conductor, the description and the electrical performance was typical of later DBD ozone generators. Later DBD patents had significant improvements. U.S. Pat. No. 4,079,260 was a water-cooled DBD design that clearly identified the importance of cooling the gas. U.S. Pat. No. 4,461,744 was the first patent to show an improvement in ozone generation efficiency using shorter electrical pulses (100 ns-1 μs) that generate only arc discharges while still operating in DBD mode at a rise time >20 ns.

U.S. Pat. No. 9,067,788 was the first patent to disclose the use of ultra-short electrical drive pulses generating uniform cold-plasma without generating arc discharges. In U.S. Pat. No. 9,067,788, the dielectric layer was bonded to the electrode using epoxy, allowing the generation of uniform cold-plasma for pulse widths greater than 10 ns.

SUMMARY OF THE INVENTION

The present invention is an electrical apparatus for efficiently generating ozone in dry air or in oxygen.

This invention describes an apparatus that provides a significant improvement in the production efficiency of ozone from either dry air or from pure or nearly pure oxygen. The invention describes an apparatus for generating ozone based on a non-arcing, non-coronal-discharge cold-plasma technique. No arcs or localized discharges are formed in the present apparatus. The described apparatus typically operates near 1 bar (100 kPa) but is capable of operating over a wide range of pressures.

Both coronal discharge (CD) and dielectric barrier discharge (DBD) techniques generate microscopic "arcs" or localized discharges while the gas is being treated. These techniques apply a direct current (DC) or pulsed voltage across the gas volume that very rapidly forms a multitude of very small arcs. The arcs that are formed have high local current densities, and these arcs exist spatially very locally in the treatment volume. The arcs have a low electrical resistance for most of their existence and generate ultraviolet radiation while only generating ozone locally. Medium-energy electrons are generated in or near these arcs that interact with the gas, thereby generating ozone. The range of these electrons is short, and ozone is only created locally to the arcs.

Any ozone production technique that generates an "arc" or a local discharge is fundamentally not efficient in the production of ozone. Arcs generate a distribution of electron energies that is non-optimal for the production of ozone by impact ionization of the oxygen. In addition, arcs are prolific UV generators, and UV at wavelengths around 250 nm actually disassociates ozone rather than generating ozone. Finally, arcs generate vibrational excitation of nitrogen molecules, which thermalizes into intensified heating. All of these effects act to lower the overall ozone production efficiency of such generators.

The new apparatus of the present invention generates cold-plasma at or near atmospheric pressure and does not involve the production of any arcs or any localized discharges. This technology does not involve dielectric barrier discharges or coronal discharges. The plasma is established using pure electric-field ionization. The parameters of the electrical driver and the cold-plasma ozone source can be optimized for the generation of ozone without generating either ultraviolet radiation or arcs, while minimizing generation of atomic species that waste energy. This cold-plasma fills the entire volume of the ozone generator nearly uniformly and treats the entire gas volume.

The present invention discloses an apparatus comprising a cold-plasma ozone generator, the ozone generator comprising: a non-arcing non-coronal ozone production cell capable of generating ozone; the ozone production cell having a pair of electrodes placed on two sides of the production cell and spaced apart by an electrode gap, and a dielectric layer on each of the electrodes facing inward into the ozone production cell; a high-voltage pulse generator attached to the electrodes and configured for producing a glow discharge cold-plasma between the electrodes, the high-voltage pulse generator being able to produce sufficient voltage to generate the glow discharge cold-plasma; a cooling system attached to each of the electrodes; and an oxygen source adapted to provide gas flow through the production cell in the gap between the pair of electrodes that efficiently generates ozone in the cold-plasma, the high-voltage pulse generator being capable of producing high-voltage electrical pulses in the range up to 100 ns at a peak electric field strength of up to 100 kV/cm, and with a repetition rate greater than 100 Hz at or about 1-bar (100 kPa) pressure, wherein the dielectric layers are intimately and directly bonded to each of the electrodes.

Further, the present invention discloses an apparatus with a dielectric layer arrangement on the electrodes that avoids the use of adhesives between the dielectric layer and the electrode; thus, enhancing the generation of uniform cold-plasma and allowing pulse widths below 10 ns, increasing the ozone output production. Further, this dielectric layer arrangement disclosed in the present invention eases the assembly of the dielectric material on the electrodes, and facilitates the bonding between them. In the present application, the electrode and the dielectric layer are in direct and intimate contact.

The present invention described herein uses a proprietary, high-voltage pulse generator that delivers ultra-short electrical pulses at high repetition rates to the ozone generator. This pulse generator is electrically efficient (>75%) and generates electrical pulses whose voltage can be readily varied between 10 kV and 25 kV although lower and higher voltage pulses are possible depending on the details of the generator. The electrical pulse widths are typically up to approximately 100 ns, and preferably between 5 ns and approximately 100 ns with pulse rise times of <5 ns. Electrical pulses shorter than approximately 5 ns do not generate uniform cold-plasma in the short time allowed. On the other hand, longer pulses (>100 ns) become less efficient in generating ozone as the plasma transitions from a uniform cold-plasma to the distributed multiple arcs typical of a dielectric barrier discharge. Besides, if the repetition rates are too low, then stable cold-plasma does not form. Repetition rates greater than approximately 100 Hz are typically necessary for reliable plasma formation.

Repetition rates up to 10 kHz or greater and pulse widths of 5 ns to 100 ns can be used to provide reasonable ozone production rates while balancing the thermal cooling requirements.

The pulse generator of the apparatus of the present invention can be based on an inductive-energy-storage technology.

In an embodiment, the new ozone generator can comprise a planar gas cell composed of two electrodes, preferably 0.25-cm-thick metal electrodes, although the material and the exact electrode thickness are not critical, each with a dielectric layer physically, intimately and directly bonded to one side of the aluminum electrode, or other conducting electrode. Such a dielectric layer can comprise ceramics, glasses, or ozone resistant polymers, whereas materials such as but not limited to aluminum, copper, stainless steel, or brass can be used for the electrodes. The electrodes are arranged with the dielectric layers facing inward creating a treatment volume in which the ozone is to be created. This dielectric layer on the electrode is critical as it totally isolates the metal of the electrodes from the corrosive effects of the ozone. The exposure of any metal electrode to ozone for an extended duration of time will destroy the electrodes. Only structures in which the electrodes are totally isolated from the ozone cell are appropriate for commercial ozone generators.

Gas (preferably dry air or oxygen) flows between the dielectric layers. The flow of the gas acts to cool the inner surface of the insulators while providing the oxygen needed to make the ozone. There is an optimum flow rate for maximum ozone concentration and another, higher, flow rate for maximum ozone production.

The electrodes are typically thick in order to provide a mechanically stiff electrode and a heat sink. The present invention preferably comprises metal electrodes at least 0.25-cm thick; although carefully produced somewhat thinner electrodes can provide the necessary mechanical stability. Thicker electrodes, while easily providing the necessary mechanical stability are simply wasteful in total cost. Thin electrodes may warp when heated and can damage the required intimate contact with the dielectric, thereby increasing electrical heating and lowering ozone production efficiency, due to the generation of arcs in the voids that might be formed. The electrodes are a critical part of the generator structure that permits cooling operations and reliable operation for thousands of hours. In the apparatus of the present invention, the dielectric insulator is intimately, directly and permanently bonded to the electrode.

Preferably, the insulator materials of the dielectric layer are typically alumina, alumina and silica, aluminum nitride, one of the various forms of diamond, polymers or a combination of them. Even more preferably, the above-mentioned dielectric layer is a plasma-spray coating layer, an electron-beam deposition layer, a chemical-vapor-deposition layer, a sintered layer, and/or a baked-on layer. Yet even more preferably, the dielectric layer is an alumina layer at least 500-µm thick or an aluminum nitride layer at most 1000-µm thick Advantageously, the gap of between the electrodes is designed to provide an electric field that is optimum for the generation of the cold-plasma. The spacing between the dielectric layers, preferably between approximately 0.5 to 2 millimeter, is precisely determined using accurate precision dielectric spacers along two opposite edges of the rectangular dielectric-coated electrodes. Other approaches known in the art could be applied to position the dielectric layers.

More advantageously, the electrodes can be planar and might have rounded edges and corners. Even more advantageously, the edges of the planar electrodes bonded to the insulator might have a radius of curvature of approximately 1 cm. This radius on the electrode removes electric field enhancement that is inherent in planar electrode configurations and prevents unwanted early formation of plasma near the edge of the electrode. This electrode profile creates a very uniform electric field over the entire volume of the generator. Without this care, the plasma would be more intense at the edges than in the majority of the volume of the generator. Similarly, a cylindrical ozone generator would have to have electrodes that have a similar radius at both ends. A wide range of electrode profiles can generate little or no field enhancement including the so called "Ernst" profiles. However, other electrode edge profiles are not excluded. The use of a simple radius in the present invention is cost driven and provides adequate performance.

More advantageously, the dielectric insulator material should have a high thermal conductivity in order to efficiently transfer heat from the inner surface of the insulator that is in contact with the plasma to the electrode. An example of an insulator having a high thermal conductivity is aluminum oxide (alumina). Alumina has a thermal conductivity of 30 W/(m·K). Other materials with excellent thermal conductivity include aluminum nitride (AlN) and diamond variants such as CVD diamond or diamond-like carbon. For example, the thermal conductivity of AlN is 285 W/(m·K), almost ten times greater than alumina.

The plasma cell apparatus of the present invention typically retains the relatively high dielectric constant of alumina. The high dielectric constant of alumina forces the majority (about 90%) of the electric field in the generator construction into the gas volume, thereby more efficiently using the electrical energy applied to the system.

The disclosure of the present invention clearly identifies the physics justification for insulators within the ozone generator with high dielectric constant, high thermal conductivity and comprising a thin dielectric layer; and has optimized these generators around both high dielectric constant insulators and around maximum cooling rates.

One of the key physical limitations for insulator thickness is the voltage holdoff of the dielectric material. Materials such as alumina and aluminum nitride have average dielectric strengths of 418 V/mil ($1.65 \times 10^7$ V/m) and 508 V/mil ($2 \times 10^7$ V/m), respectively. The present invention discloses that the ultra-short pulses used allow insulator thickness as low as 500 μm without voltage breakdown under normal operation.

Thus, both 500-μm-thick alumina, intimately and directly bonded to the electrode, and 1000-μm-thick aluminum nitride, also intimately and directly bonded to the electrode improve the maximum ozone output from the cells without a reduction in efficiency.

Thus, a 5-ns to 100-ns voltage pulse is applied to the electrodes, and the majority of the electric field appears across the gas. While the generator has many of the same elements and general configuration as a DBD generator, the short electrical pulses, the intensified electric field (5 to 10 times over DC breakdown strength), the type and thickness of the dielectric, the detailed spacing of the dielectrics, and the surface area are all provided for cold-plasma formation, not DBD arcs. The generator of the present invention uses thick electrodes for dimensional stability and uses electrodes with a dielectric layer intimately and directly bonded thereof, providing the perfect intimate, mechanical, electrical, and thermal bond of the dielectric insulator to the electrode.

Further, the ability to physically coat the insulator and provide a dielectric layer intimately and directly bonded to the electrodes enables a larger class of cylindrical ozone generators as one is not limited to commercial dimensions of alumina, alumina nitride, silica, or polymers.

The electrodes can be cylindrical in shape and arranged coaxially.

In a preferred manner, cooling of the dielectric insulator is accomplished by a cooling system of the electrodes comprising liquid and/or air coolant, and also by heat exchange with the air or oxygen used for ozone production. The relevance of the convective heat exchange over the diffusive heat exchange with the air or oxygen used for ozone production is governed by the length of the dielectric insulator, the gas flow velocity, and the thermal diffusivity dielectric insulator material, as formulated in the Péclet number. Thus, since the length of the dielectric insulator is directly proportional to the convective heat exchange, for a given flow velocity, and from a cooling standpoint, it is preferred to have a long and narrow cell than a short and wide cell. The effect of surface cooling becomes more appreciable as the cell operates at high pulse-repetition rates.

The ozone cells can be placed in series to increase the ozone concentration while maintaining improved efficiency.

In even a more preferred manner, the apparatus of the present invention comprises a non-arcing non-coronal discharge commercial planar cold-plasma ozone generator comprising, at the same time, an ozone production cell capable of generating ozone, a pair of electrodes placed on two sides of the production cell; a high-voltage pulse generator attached to the electrodes and configured for producing a glow discharge cold-plasma between the electrodes, the high-voltage pulser being able to produce sufficient voltage to generate a glow-discharge cold-plasma, a cooling system attached to each of the electrodes, a dry-air or oxygen inlet connected to a first end of the planar gas cell, and an ozone outlet connected to an opposite second end of the planar gas cell; wherein the production cell is a planar gas cell, the pair of electrodes further comprise two thick aluminum, brass, stainless steel, or copper electrodes 0.75 cm or more in thickness, each electrode has a dielectric insulating layer intimately and directly bonded with no gaps to the electrode to seal the electrode for isolation from ozone within the ozone production cell, the electrodes have about 1-cm radii on all edges and sides bonded to the insulator layers, the electrodes have dimensions of about 10 cm in width and about 20 cm in length, the electrodes are spaced apart about 0.5 to 1.5 mm by thin spacers of alumina or polymer, the high-voltage pulse generator is configured to operate at a peak voltage of about 15 kV to 25 kV and a pulse repetition rate of about 1 kHz to 10 kHz and a pulse width of about 5 ns to 20 ns, and the cooling system comprises either air and/or liquid for cooling the electrodes.

The present invention also discloses a method for manufacturing such apparatus, wherein the method comprises a step of directly bonding the dielectric layer to each of the electrodes using a physical deposition technique such as plasma spray, electron-beam deposition, chemical vapor deposition, sintering, and bake on processes; thereby creating an intimate, physical, and direct bond between the dielectric layer and the electrodes, with no intermediate layer between the dielectric layer and each electrode.

For a better understanding, drawings of an embodiment of the equipment to which this invention relates are appended by way of an explanatory but no limiting example.

In the figures, identical or equivalent elements have been given the same reference numerals.

BRIEF DESCRIPTION OF THE DRAWINGS

FIG. 1 is a block diagram of the electrical schematic of the ozone generating apparatus showing the electrical pulse generator, the ozone-generating gas cell, and the air feed system.

FIG. 2 and FIG. 3 are an end view and a side view of a schematic of a planar ozone generator, wherein the gas flows from left to right in FIG. 3. The electric field is extremely uniform in along and across the gas cell of the ozone generator. The electrodes are thick enough to act as a heat sink and are externally cooled. There is an intimate, physical and direct contact between the dielectric layers and the electrodes, which means that the dielectric layer and the electrode are in direct contact with each other. This feature eliminates internal arcing (and resultant heat generation) and to optimize heat flow from the interior of the gas cell to the cooled electrodes.

FIG. 4 and FIG. 5 are an end view and a side view of is a schematic of a cylindrical ozone generator, wherein the gas flows through the cylinder from left to right in FIG. 5. The electric field is uniform along the generator in an axial direction but decreases only very slightly in the radial direction due to the very small radial extent of the ozone generating volume. The electrodes are thick enough to act as a heat sink and are cooled. There is intimate physical direct contact between the dielectric layers and the electrodes to eliminate internal arcing (and resultant heat generation) and to optimize heat flow from the interior of the gas cell to the cooled electrodes.

DETAILED DESCRIPTION OF THE DRAWINGS

Figure 1:
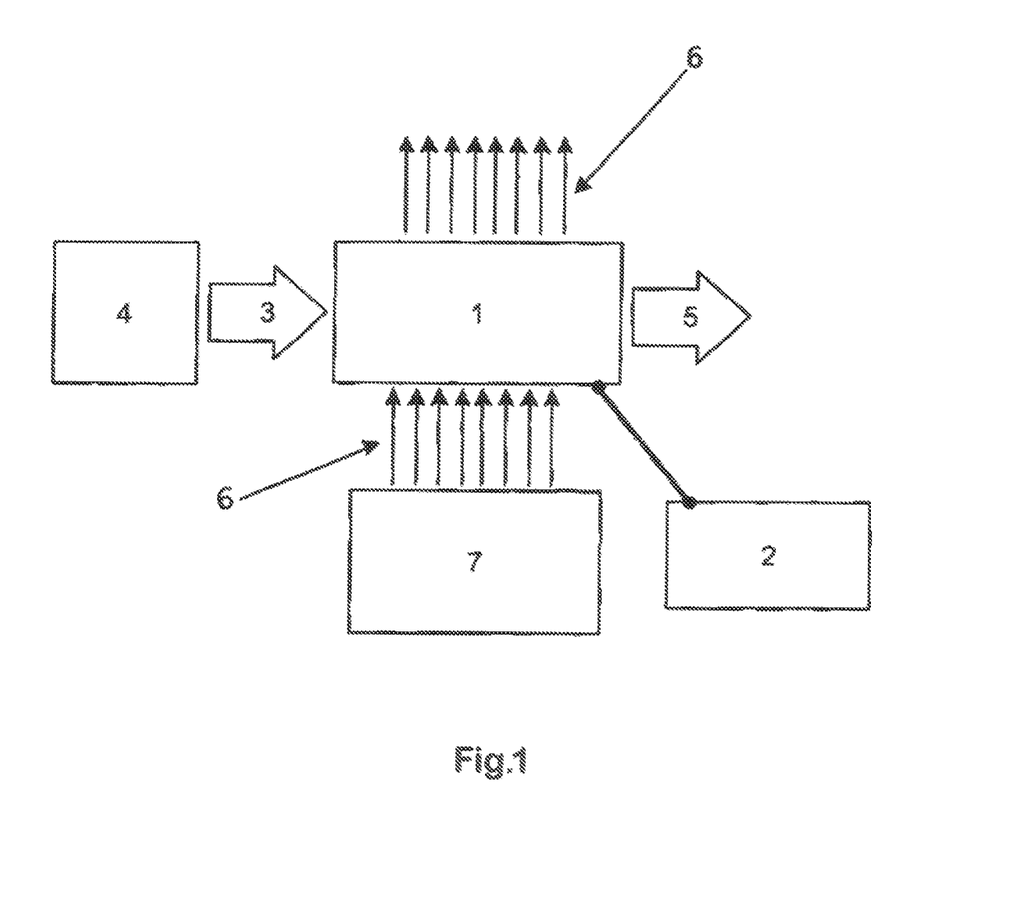
FIG. 1 shows a block diagram of the present invention.

FIG. 1 shows key elements of the cold-plasma ozone generator system. The cold-plasma generator 1 is electrically driven by a high voltage pulser 2. Air 3 is provided to the ozone generator 1 from an air dryer 4. If pure or nearly pure oxygen is desired then the air dryer 4 is replaced with an oxygen concentrator that dries the oxygen at the same time or by bottled or liquid oxygen. The output ozone 5 is output from the ozone generator to the user. Cooling air 6 from a high-velocity fan 7 is blown onto the ozone generator 1 to cool the ground and high voltage electrodes. Alternatively or additionally, the electrodes can be cooled with chilled water or other liquids (not shown).

Figure 2:
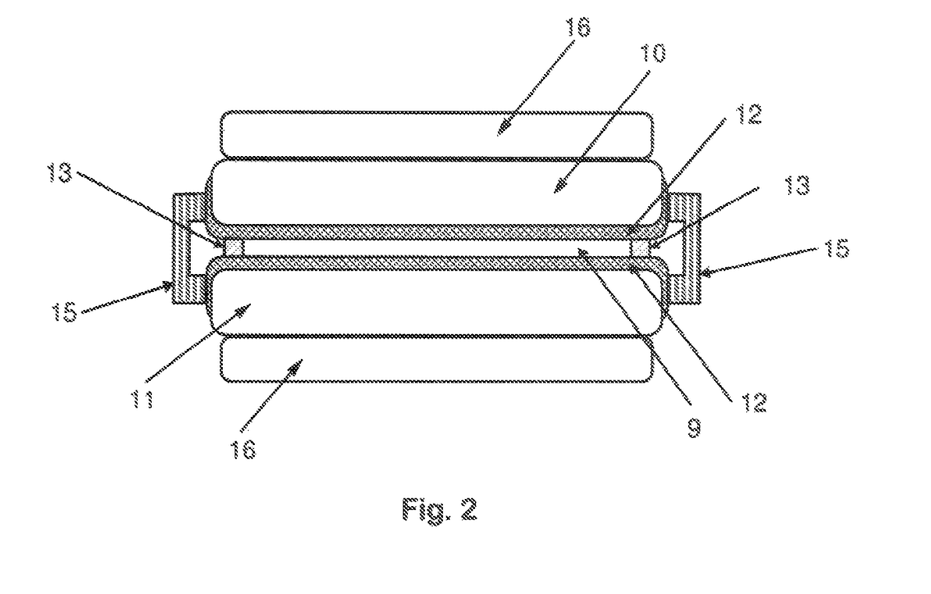
FIG. 2 shows an end view of a schematic representation of a planar cold-plasma ozone generator according to the present invention.
Figure 3:
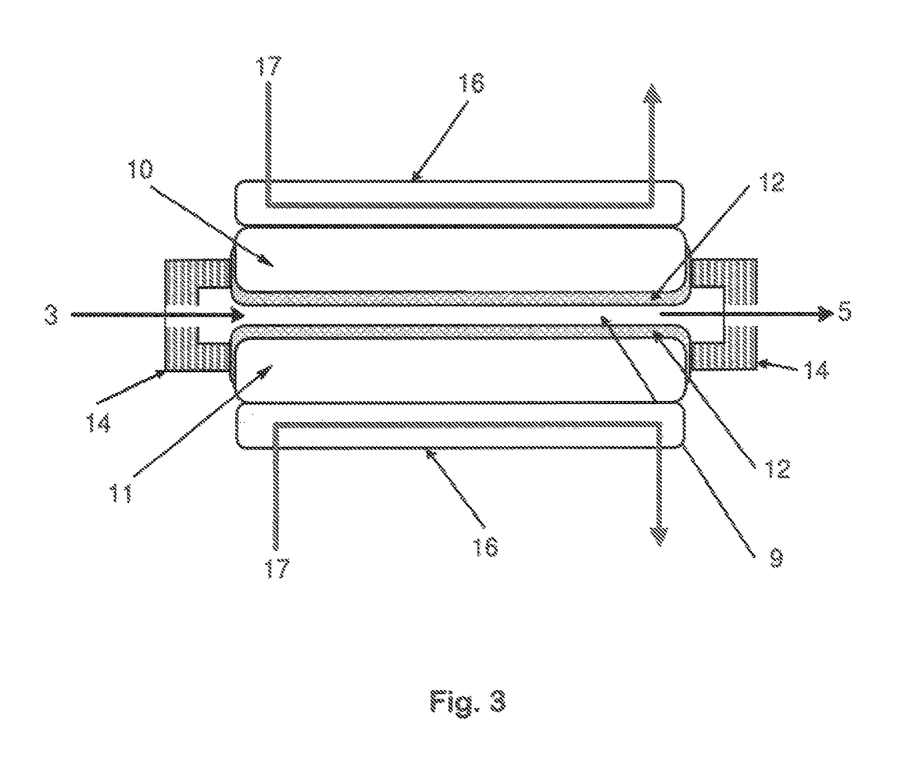
FIG. 3 shows a side view of a schematic representation of the planar cold-plasma ozone generator shown in FIG. 2.

FIG. 2 and FIG. 3 show the detailed elements of a planar, cold-plasma ozone generator in an end view and a side view, respectively. The cold-plasma generator has two, thick aluminum-plate electrodes, the ground electrode 10 and the high voltage electrode 11. Both electrodes have thin dielectric insulators 12 intimately and directly bonded to one side of the electrode, which means that the dielectric layer and the electrode are in direct contact with each other. The insulating surfaces face each other and create a volume 9 in which the ozone is generated. Note that the insulating surfaces cover the entire electrode surface exposed to ozone. Further, since the insulating dielectric surfaces can be applied as a coating, these might also extend to lateral walls of the electrode to ease the assembly of the apparatus and maintaining a secure configuration. The electrodes 10,11 together with the attached insulators 12 are spaced precisely apart using long, thin spacers 13 of dielectric material. Ozone resistance epoxies or polymeric sealing techniques using ozone-resistance materials are used to firmly position the spacers 13 on both insulators 12 of the electrodes 10,11 to provide a gas seal. The electrode/insulator assembly is then held at each end with gas feed plates 14 into which air 3 or oxygen flows into the generator and out of which ozonated air 5 or oxygen leaves the system. Side plates 15 are also used to provide mechanical support for the electrode/insulator assembly. A heat sink/finned radiator 16 is used to cool the ground electrode 10 and the high-voltage electrode 11 using either air or liquid 17.

Figure 4:
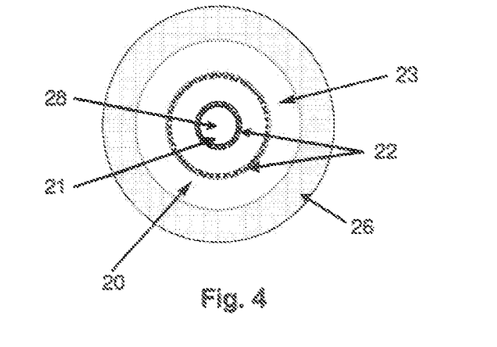
FIG. 4 shows an end view of a schematic representation of a cylindrical cold-plasma ozone generator according to the present invention.
Figure 5:
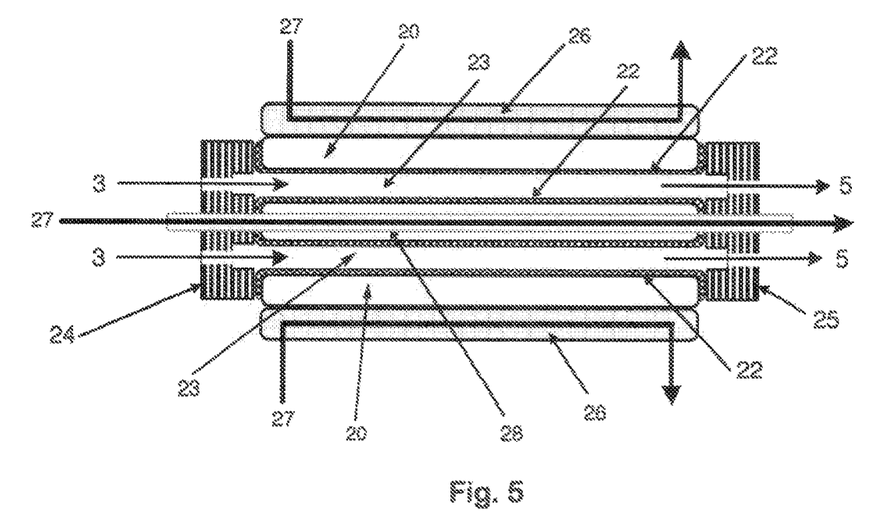
FIG. 5 shows an end view of a schematic representation of a cylindrical cold-plasma ozone generator shown in FIG. 4.

FIG. 4 and FIG. 5 show the detailed elements of a cylindrical cold-plasma ozone generator in an end view and a side view, respectively. The cold-plasma generator has two, thick cylindrical-aluminum electrodes. The ground electrode 20 is the outer electrode and the high voltage electrode 21 is the inner electrode. Both electrodes have thin, cylindrical dielectric insulators 22 intimately and directly bonded to one side of each electrode. The outer electrode 20 has the dielectric coating 22 on the inside and the inner electrode 21 has the dielectric coating 22 on the outside. The insulators face each other and create the volume 23 in which the ozone is generated. Again, since the insulating dielectric surfaces can be applied as a coating, these might also extend to end walls of the cylindrical electrodes, allowing these electrodes to be used as commercially available products, but with the benefit of dimension versatility.

The electrodes 20,21 together with the attached insulators 22 are spaced precisely apart using insulating end plates 24,25 made of ceramic (e.g. alumina or silica), polymers (e.g. Lexan™ (polycarbonate), Mylar, or Teflon (fluorocarbons). The end plates are attached so as to mechanically position the electrodes 20,21 and insulators 22 and to provide a perfect gas seal. Air 3 or oxygen flows into the generator through input end plate 24 and ozonated air 5 or oxygen leaves the system through the output end plate 25. A heat sink/finned radiator 26 is used to cool the cylindrical ground electrode 20 using water 27 or air. The inner cylindrical high voltage electrode 21 is liquid cooled 27 filling an inner cylindrical void 28.

The foregoing detailed description of the invention enables one skilled in the art to readily fabricate the disclosed generator.

PREFERRED EMBODIMENT

The high-voltage electrical pulser generates pulses using solid-state switches in an inductive energy-storage configuration. The pulser can be readily optimized in pulse length, repetition rate, and/or absolute maximum voltage depending on the specific embodiment. The output voltage is a strong function of the impedance of the generator and the surface area of the ozone generator. Initially, the generator has high load impedance due to the lack of plasma and the pulser output voltage on the generator is quite high-approaching its design limit. As the plasma forms, the overall instantaneous impedance of the generator falls and the voltage on the generator almost instantaneously decreases to hold the power delivered to the generator constant.

An inductive voltage generator has better driver characteristics than a pulser that uses a capacitive energy storage system. In inductive pulser schemes, the voltage on the generator will increase until plasma forms and then the voltage falls as the plasma forms. If the plasma begins to quench, the pulser voltage will increase in order to sustain the plasma. This concept provides a very stable plasma source and is insensitive to changes in the gas pressure and gas content. In addition, inductive energy storage pulsers operate with low input voltages and can be precisely tuned for a fixed pulse width. Capacitive-based pulsers, on the other hand, have a single maximum voltage that can be delivered to the generator. This same maximum voltage will always be applied to the generator regardless of the plasma conditions.

Depending on the switching technology used, a capacitive-energy storage pulser can have a short well-defined pulse width but the voltage delivered depends on the charge voltage of the system and the size of the storage capacitor, not the instantaneous impedance of the load. Such pulsers often drive plasmas into arc generation.

The preferred embodiment uses an inductive energy-storage pulser that operates with a peak voltage of 10 kV to 25 kV; has a pulse repetition rate up to 10 kHz; and has a pulse width of 5 to 20 nanoseconds (ns). While a wide range of pulser parameters are possible, these parameters are nearly optimum for high efficiency ozone production in the generator.

The ozone generator geometry can be planar. The electrodes have typical dimensions of 10 cm in width and 20 cm in length. The overall surface area of the generator is important for the optimal efficiency. A generator that is too small for the output voltage (and power) of the pulser will have an average voltage that is too high for the most efficient generation of ozone, while a generator that is too large for the output voltage (and power) of the generator will not form a uniform plasma over the entire area of the electrodes. The gap of between the dielectric layers is designed to provide an electric field that is optimum for the generation of the cold-plasma and is preferably 1-millimeter wide. Nevertheless, the gap can be as small as approximately 0.5 mm and as large as 2 mm. Potential dielectric insulating materials intimately and directly bonded to the electrodes include silica, alumina/silica mixtures, high-temperature ozone-resistant polymers, and, preferably, aluminum oxide (alumina).

Advantageously, these materials can be physically deposited to the electrodes to get excellent adhesion.

More advantageously, the ozone generator is designed to keep all of the components of the ozone generator as cool as possible. This is critical because ozone is destroyed by heat. The temperature of the ozone generators is controlled using air and/or liquid cooling. Additionally, the flow velocity of gas through the generator helps to cool the inner insulator surfaces of the generator and allows higher pulse repetition rates, leading to increase ozone production.

OTHER EMBODIMENTS

While the preferred embodiment geometry is planar because of the precise control that such geometries provide to the generated electric fields and the uniformity of the airflow—other geometries are possible. Co-axial, cylindrical geometries (FIG. 4 and FIG. 5) that have been built and tested work well. Cylindrical geometries can be more costly but the addition of dielectric layers intimately and directly bonded onto the electrodes eliminates tolerance issues between the dielectric and the conducting cylinders and the resulting adhesion concerns. Preferably, these dielectric layers can be bonded using physical deposition processes that include but are not limited to plasma spray, chemical vapor deposition, sintering, and bake on processes.

Advantageously, cylindrical geometries reduce the generation of electrical noise and can be more compact than planar designs.

Multiple generators can be placed in series and in parallel to increase the ozone concentration and the total ozone generating capacity of the entire system. This likely requires a separate electrical pulser for each individual generator. The generator design of the present invention is optimized for cost and availability of the pulser and the ease in fabrication of the generator itself.

A wide range of dielectric materials are possible instead of ceramics such as alumina or sapphire. As previously discussed the use of glass dielectrics such as but not limited to Pyrex™ are possible. Similarly, the development of new dielectric insulators such as aluminum nitride (AlN) may have superior performance characteristics over alumina or sapphire. Other polymeric dielectrics such as but not limited to Teflon (fluorocarbons), Kapton (polyimide), polycarbonates, PEEK (polyetherether ketone), polyurethane, Kynar (PVDF), and Mylar can be used in very cost sensitive applications but temperature limits must be carefully observed. All of these polymers can be physically coated onto the electrodes at low cost to provide a physical, intimate and direct bond to the electrodes.

Further, a wide range of electrode materials is possible besides aluminum. While aluminum was discussed for cost and machining concerns, conducting materials such as but not limited to copper, brass, nickel, and steel are all options.

While the invention has been described with reference to specific embodiments, modifications and variations of the invention may be constructed without departing from the scope of the invention.

The invention claimed is:

1. An apparatus comprising a cold-plasma ozone generator, the ozone generator comprising: a non-arcing non-coronal ozone production cell capable of generating ozone; the ozone production cell having a pair of electrodes placed on two sides of the production cell and spaced apart by an electrode gap, and a dielectric layer on each of the electrodes facing inward into the ozone production cell; a high-voltage pulse generator attached to the electrodes and configured for producing a glow discharge cold plasma between the electrodes, the high-voltage pulse generator being able to produce sufficient voltage to generate the glow discharge cold plasma; a cooling system attached to each of the electrodes; and an oxygen source adapted to provide gas flow through the production cell in the gap between the pair of electrodes that efficiently generates ozone in the cold plasma, wherein the dielectric layers are intimately and directly bonded to each of the electrodes without the use of adhesive between the dielectric layer and the electrode.

2. The apparatus according to claim 1, wherein the dielectric layer is one or more of the group consisting of alumina, sapphire, silica, aluminum nitride, diamond or polymers.

3. The apparatus according to claim 2, wherein the dielectric later is a plasma-spray coating layer, an electron-beam deposition layer, a chemical-vapor-deposition layer, a sintered layer, and/or a baked on layer.

4. The apparatus according to claim 3, wherein the dielectric layer is alumina at least 500-μm thick or aluminum nitride at most 1000-μm-thick.

5. The apparatus according to claim 1, wherein the electrodes are metal electrodes 0.25-cm thick or greater.

6. The apparatus according to claim 1, wherein the electrodes are planar.

7. The apparatus according to claim 6, wherein the electrodes are rounded at the edges and corner thereof, thereby creating uniform electric fields in the ozone production cell.

8. The apparatus according to claim 1, wherein the electrodes are cylindrical in shape and are arranged coaxially.

9. The apparatus according to claim 1, wherein the electrodes are spaced by the electrode gap with precision spacers of approximately 0.5 to 2 mm.

10. The apparatus according to claim 1, wherein the pulse generator is based on an inductive-energy-storage technology.

11. The apparatus according to claim 1, wherein the high-voltage pulse generator operates at repetition rates greater than 10 kHz and pulse widths of 5 ns to 100 ns.

12. An apparatus according to claim 1, wherein the cooling system of the electrodes comprises liquid and/or air as coolant.

13. The apparatus according to claim 1, wherein the gas flow provided is dry air or oxygen.

14. The apparatus according to claim 1, wherein ozone cells are placed in series to increase the ozone concentration while maintaining improved efficiency.

15. An apparatus comprising a cold-plasma ozone generator, the ozone generator comprising: a non-arcing non-coronal ozone production cell capable of generating ozone; the ozone production cell having a pair of electrodes placed on two sides of the production cell and spaced apart by an electrode gap, and a dielectric layer on each of the electrodes facing inward into the ozone production cell; a high-voltage pulse generator attached to the electrodes and configured for producing a glow discharge cold plasma between the electrodes, the high-voltage pulse generator being able to produce sufficient voltage to generate the glow discharge cold plasma; a cooling system attached to each of the electrodes; and an oxygen source adapted to provide gas flow through the production cell in the gap between the pair of electrodes that efficiently generates ozone in the cold plasma, wherein the high-voltage pulse generator is capable of producing high-voltage electrical pulses in the range up to 100 ns at a peak electric field strength of up to 100 kV/cm, and with a repetition rate greater than 100 Hz at or about 1-bar (100 kPa) pressure, and the dielectric layers are plasma-spray coating layers, electron-beam deposition layers, chemical-vapor-deposition layers, sintered layers and/or baked on layers of the group consisting of alumina, sapphire, silica, aluminum nitride, diamond or polymers and are intimately and directly bonded to each of the electrodes without the use of adhesive between the dielectric layer and the electrode.

16. The apparatus according to claim 15, wherein the dielectric layer is alumina at least 500 μm thick or aluminum nitride at most 1000-μm-thick.

17. An apparatus comprising a cold-plasma ozone generator, the ozone generator comprising: a non-arcing non-coronal ozone production cell capable of generating ozone; the ozone production cell having a pair of electrodes placed on two sides of the production cell and spaced apart by an electrode gap, and a dielectric layer on each of the electrodes facing inward into the ozone production cell; a high-voltage pulse generator attached to the electrodes and configured for producing a glow discharge cold plasma between the electrodes, the high-voltage pulse generator being able to produce sufficient voltage to generate the glow discharge cold plasma; a cooling system attached to each of the electrodes; and an oxygen source adapted to provide gas flow through the production cell in the gap between the pair of electrodes that efficiently generates ozone in the cold plasma, wherein the pair of electrodes comprise two aluminum, brass, stainless steel or copper electrodes at least 0.75-cm thick, the electrodes have dimensions of about 10 cm in width and about 20 cm in length and all edges and sides of the electrode bonded to the dielectric layer have about 1-cm radii of curvature, the electrode gap is defined by alumina or polymer precision spacers, the high-voltage pulse generator is configured to operate at a peak voltage of about 15 kV to 25 kV, pulse repetition rate of about 1 kHz to 10 kHz and pulse width of about 5 ns to 20 ns, and the dielectric layers are plasma-spray coating layers, electron-beam deposition layers, chemical-vapor-deposition layers, sintered layers and/or baked on layers of the group consisting of alumina, sapphire, silica, aluminum nitride, diamond or polymers and are intimately and directly bonded to each of the electrodes without the use of adhesive between the dielectric layer and the electrode.

18. The apparatus according to claim 17, wherein the dielectric layer is alumina at least 500-μm thick or aluminum nitride at most 1000-μm-thick.

\* \* \* \* \*